United States Patent
Khoury et al.

(10) Patent No.: US 10,692,502 B2
(45) Date of Patent: Jun. 23, 2020

(54) METHOD AND APPARATUS FOR DETECTING SPOOFING CONDITIONS

(71) Applicant: PINDROP SECURITY, INC., Atlanta, GA (US)

(72) Inventors: Elie Khoury, Atlanta, GA (US); Parav Nagarsheth, Atlanta, GA (US); Kailash Patil, Atlanta, GA (US); Matthew Garland, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 95 days.

(21) Appl. No.: 15/910,387

(22) Filed: Mar. 2, 2018

(65) Prior Publication Data
US 2018/0254046 A1    Sep. 6, 2018

Related U.S. Application Data

(60) Provisional application No. 62/466,911, filed on Mar. 3, 2017.

(51) Int. Cl.
| | | |
|---|---|---|
| *G10L 17/02* | (2013.01) | |
| *G10L 17/04* | (2013.01) | |
| *G10L 17/06* | (2013.01) | |
| *G10L 17/18* | (2013.01) | |
| *G10L 19/02* | (2013.01) | |
| *G10L 25/24* | (2013.01) | |
| *G10L 17/00* | (2013.01) | |

(52) U.S. Cl.
CPC ............. *G10L 17/02* (2013.01); *G10L 17/00* (2013.01); *G10L 17/04* (2013.01); *G10L 17/06* (2013.01); *G10L 17/18* (2013.01); *G10L 19/02* (2013.01); *G10L 25/24* (2013.01)

(58) Field of Classification Search
CPC ......... G10L 17/02; G10L 17/06; G10L 19/02; G10L 17/18; G10L 25/24; G10L 17/04; G10L 17/00
USPC ........................................................ 704/246
See application file for complete search history.

(56) References Cited

U.S. PATENT DOCUMENTS

| | | |
|---|---|---|
| 8,145,562 B2 | 3/2012 | Wasserblat et al. |
| 8,478,600 B2 | 7/2013 | Cho et al. |
| 9,372,976 B2 | 6/2016 | Bukai |
| 9,412,365 B2 | 8/2016 | Biadsy et al. |
| 9,502,038 B2 | 11/2016 | Wang et al. |

(Continued)

FOREIGN PATENT DOCUMENTS

| | | | | |
|---|---|---|---|---|
| WO | WO-2018166316 A1 | * | 9/2018 | ............. G10L 25/30 |

OTHER PUBLICATIONS

Alegre et al., "Re-assessing the Threat of Replay Spoofing Attacks Against Automatic Speaker Verification," 2014 International Conference of BIOSIG, Sep. 2014, pp. 157-168.

(Continued)

*Primary Examiner* — Edwin S Leland, III
(74) *Attorney, Agent, or Firm* — Foley & Lardner LLP

(57) ABSTRACT

An automated speaker verification (ASV) system incorporates a first deep neural network to extract deep acoustic features, such as deep CQCC features, from a received voice sample. The deep acoustic features are processed by a second deep neural network that classifies the deep acoustic features according to a determined likelihood of including a spoofing condition. A binary classifier then classifies the voice sample as being genuine or spoofed.

22 Claims, 6 Drawing Sheets

(56) References Cited

U.S. PATENT DOCUMENTS

Figure 3A:
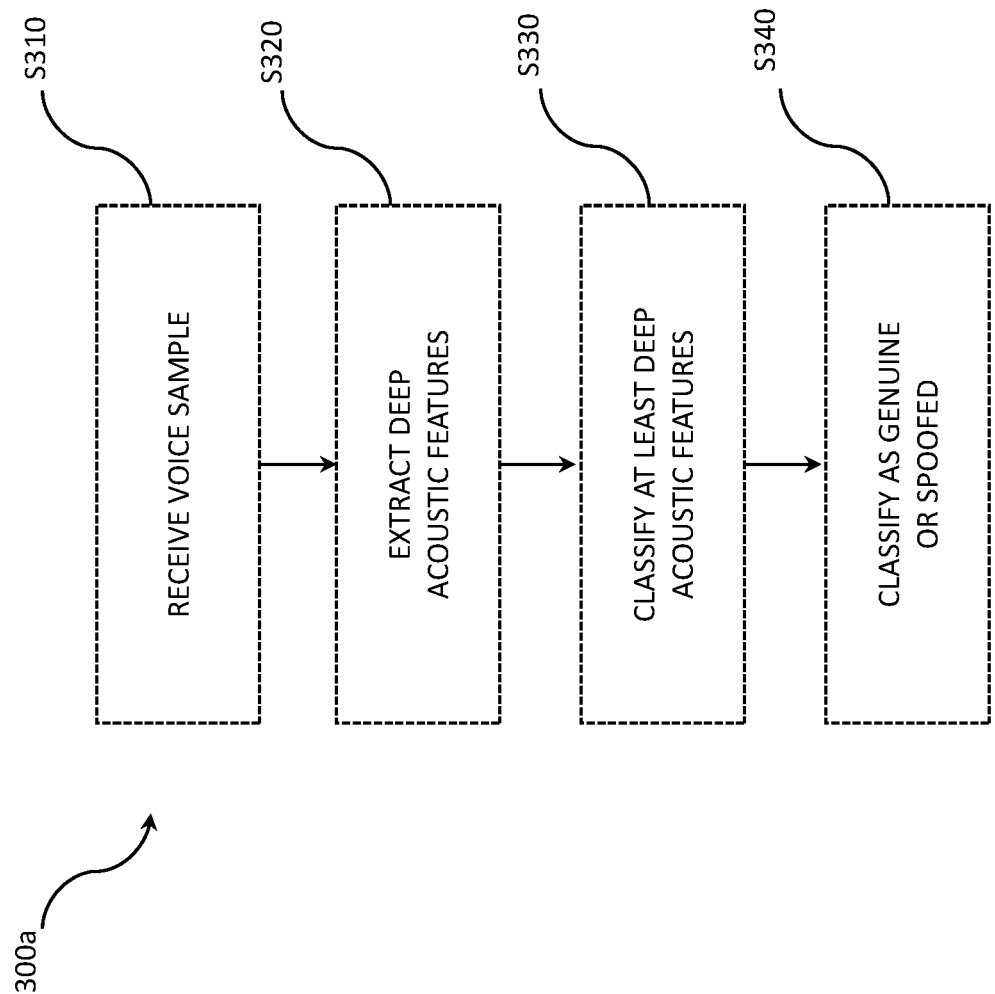

| | | | | |
|---|---|---|---|---|
| 9,824,692 | B1* | 11/2017 | Khoury | G10L 17/02 |
| 10,311,872 | B2* | 6/2019 | Howard | G10L 15/30 |
| 10,418,957 | B1* | 9/2019 | Wang | H03G 3/32 |
| 2011/0082877 | A1* | 4/2011 | Gupta | G10L 25/00 707/769 |
| 2015/0088509 | A1 | 3/2015 | Giménez et al. | |
| 2015/0112682 | A1 | 4/2015 | Rodriguez et al. | |
| 2016/0248768 | A1 | 8/2016 | McLaren et al. | |
| 2016/0293167 | A1 | 10/2016 | Chen et al. | |
| 2017/0084292 | A1 | 3/2017 | Yoo | |
| 2017/0169815 | A1 | 6/2017 | Zhan et al. | |
| 2017/0256254 | A1* | 9/2017 | Huang | G10L 15/02 |
| 2017/0330586 | A1* | 11/2017 | Roblek | G10L 25/30 |
| 2018/0082692 | A1* | 3/2018 | Khoury | G10L 17/18 |
| 2018/0150740 | A1* | 5/2018 | Wang | G06T 7/11 |
| 2018/0174575 | A1* | 6/2018 | Bengio | G10L 15/16 |
| 2018/0254046 | A1* | 9/2018 | Khoury | G10L 17/04 |
| 2019/0013013 | A1* | 1/2019 | McLaren | G10L 17/04 |
| 2019/0050716 | A1* | 2/2019 | Barkan | G06N 3/08 |

OTHER PUBLICATIONS

Ergunay et al., "On the Vulnerability of Speaker Verification to Realistic Voice Spoofing," IEEE ICBTAS IEEE, Sep. 2015, pp. 1-6.

Ioffe, et al., "Batch Normalization: Accelerating Deep Network Training by Reducing Internal Covariate Shift", Proceedings of the 32nd ICML—vol. 37, pp. 448-456, Lille, France, Jul. 6-11, 2015.

Todisco et al., "A New Feature for Automatic Speaker Verification Anti-Spoofing: Constant Q Cepstral Coefficients", Odyssey, Jun. 2016.

Yu, et al., "Spoofing Detection in Automatic Seaker Verification Systems Using DNN Classifiers and Dynamic Acoustic Features", IEEE Transactions on Neural Networks and Learning Systems, vol. PP, Iss. 99, Dec. 4, 2017.

Notification of Transmittal of the International Search Report and the Written Opinion of the International Searching Authority, dated May 29, 2018, in corresponding International Application No. PCT/US2018/020624, 12 pages.

Zhang et al., "An Investigation of Deep-:Learning Frameworks for Speaker Verification Antispoofing", IEEE Journal of Selected Topics in Signal Processing, IEEE, US, vol. 11, No. 4, Jan. 16, 2017, pp. 684-694.

Wu et al., "ASVspoof: The Automatic Speaker Verification Spoofing and Countermeasures Challenge", IEEE Journal of Selected Topics in Signal Processing, IEEE, US, vol. 11, No. 4, Feb. 17, 2017, pp. 588-604.

Alam et al., "Spoofing Detection on the ASVspoof2015 Challenge Corpus Employing Deep Neural Networks", Odyssey 2016, vol. 2016, Jun. 21, 2016, pp. 270-276.

Todisco et al., "A New Feature for Automatic Speaker Verification Anti-Spoofing: Constant Q Cepstral Coefficients", Odyssey 2016, vol. 2016, Jun. 21, 2016, pp. 283-290.

Nagarsheth et al., "Replay Attack Detection Using DNN for Channel Discrimination", Interspeech 2017, Aug. 20, 2017, pp. 97-101.

* cited by examiner

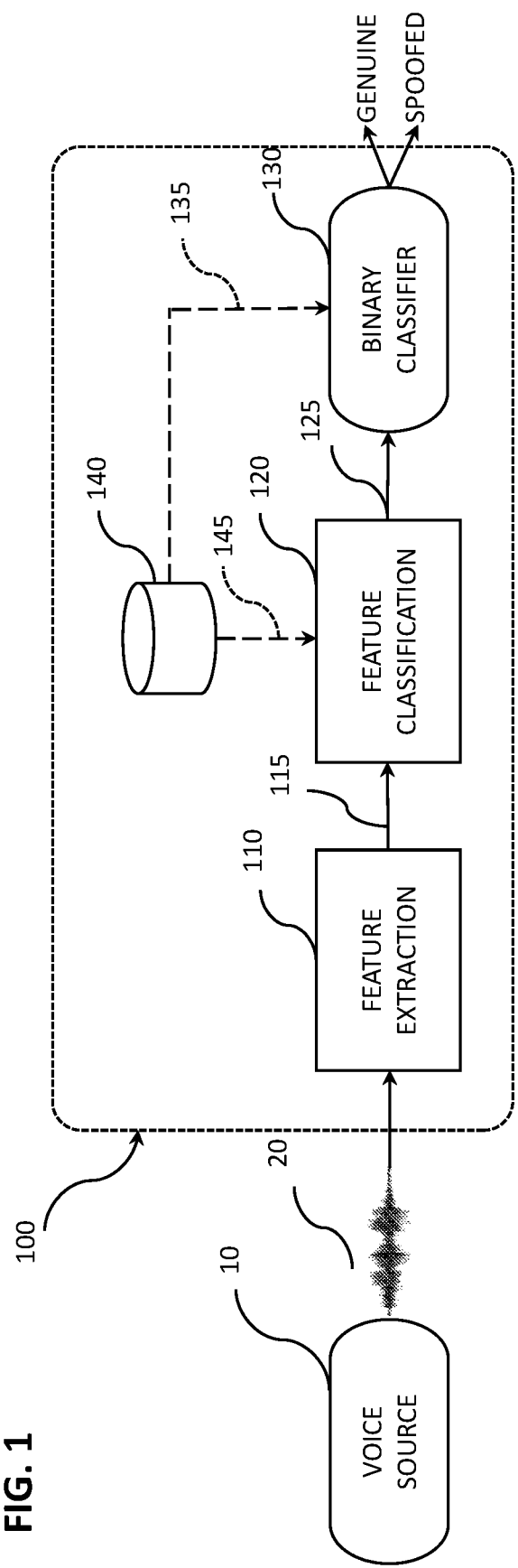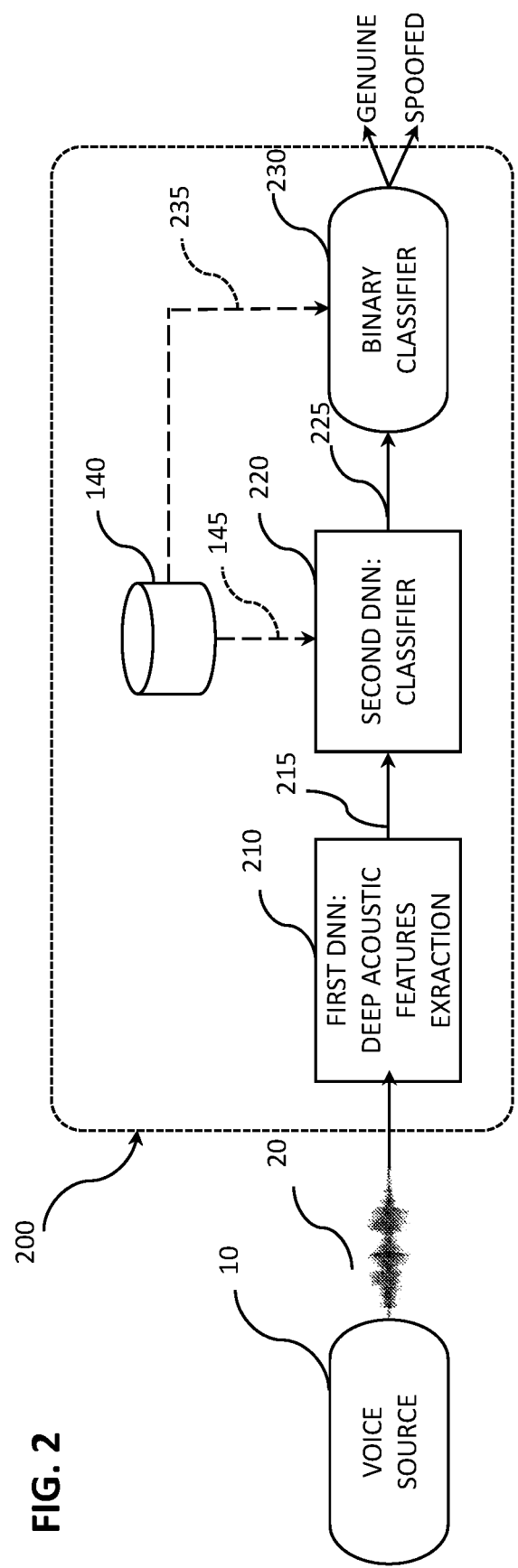

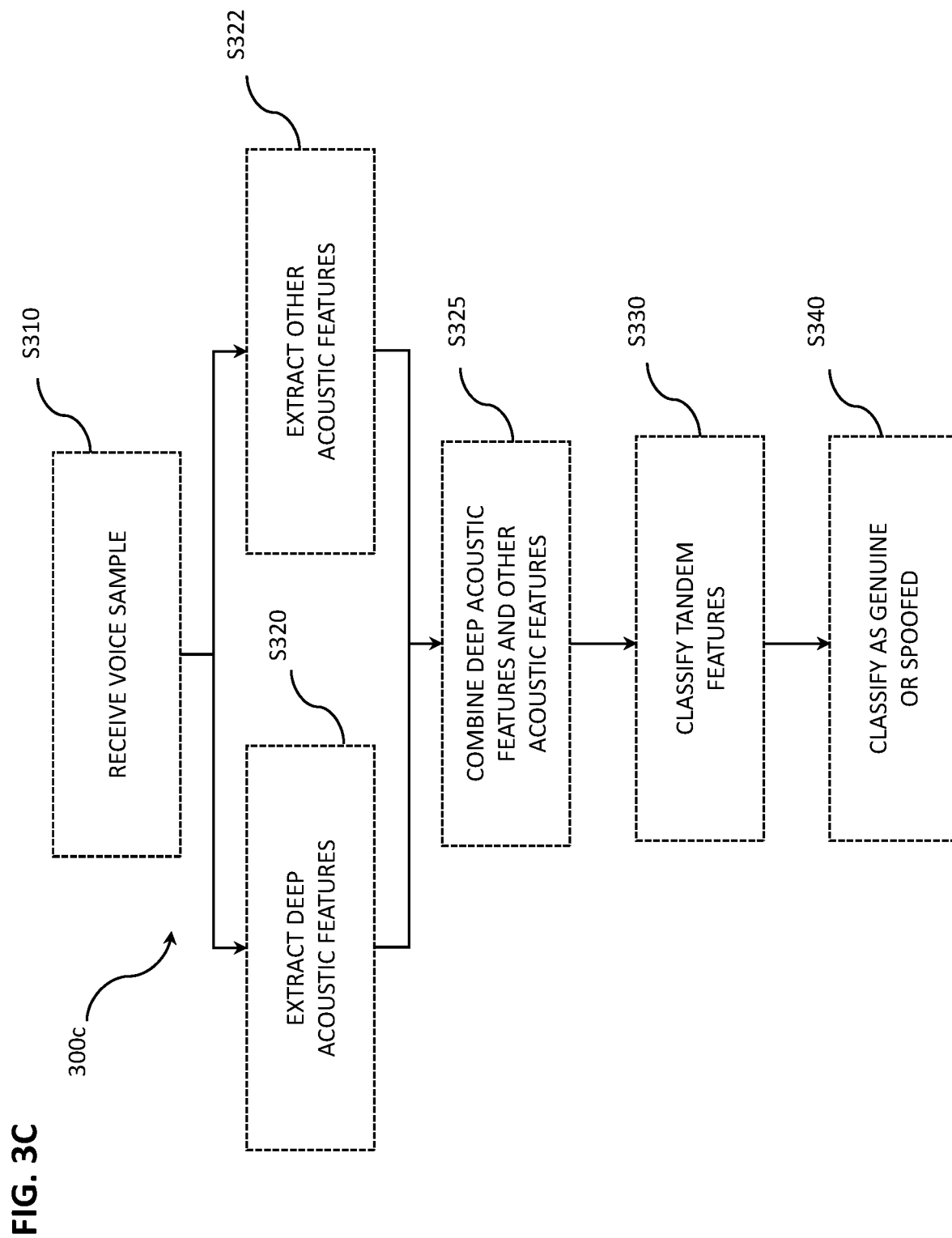

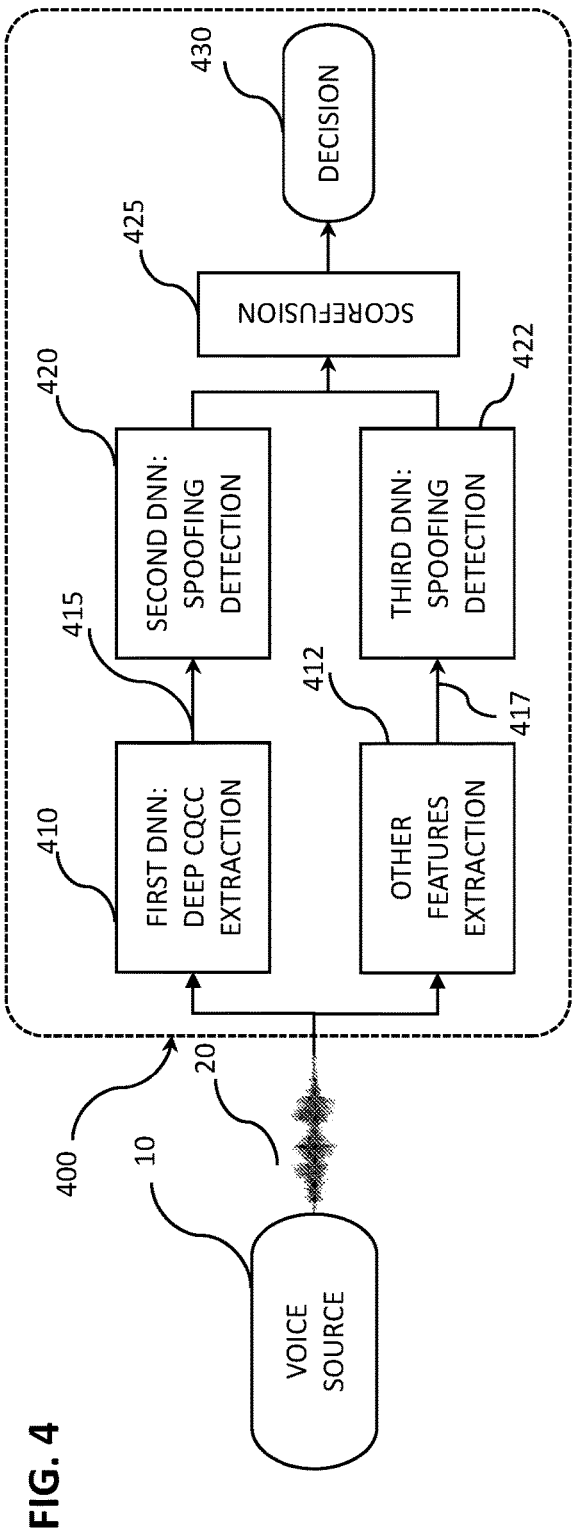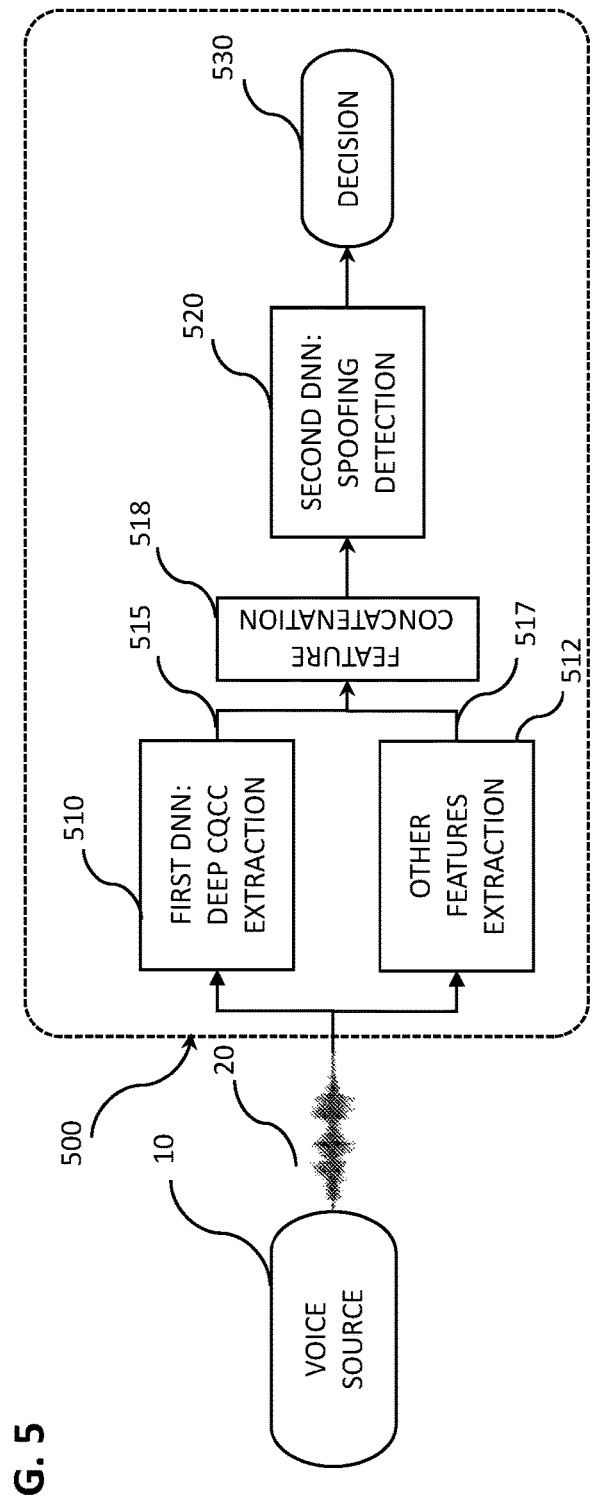
FIG. 4
FIG. 5

METHOD AND APPARATUS FOR DETECTING SPOOFING CONDITIONS

This disclosure claims domestic benefit, under 35 U.S.C. § 119, of U.S. Provisional Application No. 62/466,911 filed 3 Mar. 2017, titled "Spoofing Detection", which application is incorporated herein by reference.

BACKGROUND

Modern systems are increasingly voice-centric, and in many cases rely on voice-based security approaches, including Automated Voice Recognition (AVR) and the like to ensure that a current speaker is an authorized user of the system. Although various approaches realize moderate success in ensuring that a received audio sample matches a previously enrolled audio sample or corresponding voice model, conventional systems are vulnerable to "spoofing" attacks in which a fraudulent user may employ techniques like voice conversion, speech synthesis and replay attacks to substantially approximate the authentic enrollee. Fraudulent replay attacks, for example, are easy to generate with no expertise required in speech processing and machine learning. With use of high-quality playback and recording devices, it is conceivable to make replay attacks indistinguishable from a genuine access in conventional systems.

Constant Q Cepstral Coefficients (CQCCs) are perceptually-inspired time-frequency analysis acoustic features that are found to be powerful at detecting voice spoofing attacks, namely audio playback, voice conversion and morphing, and speech synthesis attacks. (See, e.g., Todisco et al., "A New Feature for Automatic Speaker Verification Anti-Spoofing: Constant Q Cepstral Coefficients," Odyssey 2016.) However, drawbacks of the conventional technique for obtaining CQCCs include high costs in terms of memory usage and processing time. Moreover, conventional systems employee CQCC features discriminate only between spoofed and non-spoofed utterances.

SUMMARY

The present disclosure is directed to a methods and apparatuses for use in, for example an automatic speaker verification (ASV) system, to distinguish between a genuine, authorized speaker (e.g., a caller) and a fraudulent one, particularly one employing a replay attack, as discussed in further detail below.

According to an embodiment, a method for detecting a spoofed voice source includes receiving a voice sample, extracting at least deep acoustic features from the voice sample using a first deep neural network (DNN), and calculating, via a second DNN that receives the extracted at least deep acoustic feature, a likelihood that the voice sample includes a spoofing condition.

According to an embodiment, the method may additionally include classifying the voice sample, using a binary classifier, as being either genuine or spoofed based on the likelihood from the second DNN.

According to an embodiment, the deep acoustic features are deep constant Q cepstral coefficients (CQCC).

According to an embodiment, the spoofing conditions include at least one of channel conditions and audio conditions.

According to an embodiment, the channel conditions include channel artifacts specific to at least one of different background environments, different acquisition devices, and different network infrastructures.

According to an embodiment, the method may also include extracting other acoustic features from the voice sample, combining the deep acoustic features with the other acoustic features to provide tandem features, and classifying the tandem features using the second DNN, the second DNN configured to determine whether the tandem features include a non-spoofing condition or at least one spoofing condition. Classifying at least the deep acoustic features is part of the classifying of the tandem features.

According to an embodiment, the other acoustic features are sub-band cepstral coefficient (SBCC) features, and the method may further include sub-band filtering the voice sample before extracting the other features from the filtered sample. Extracting the other, SBCC features includes calculating a short-time Fourier transform (STFT) on a frame from the filtered sample, calculating a power spectrum from the STFT, calculating a log-amplitude from the power spectrum, calculating an inverse discrete cosine transform (IDCT) of the log-amplitude, and calculating dynamic features based on the IDCT.

According to an embodiment, filtering the audio sample includes using a high pass filter, the filtered sample being limited to frequencies above a predetermined cutoff frequency.

According to an embodiment, calculating dynamic features includes calculating at least one of delta and delta-delta (acceleration) features.

According to an embodiment, the second DNN is configured to extract multi-class features from the at least deep acoustic features.

According to an embodiment, the first DNN and the second DNN each include at least an input layer, hidden layers, including one or more convolutional layers followed by a max-pooling layer, one or more fully-connected layers, and an output layer.

According to an embodiment, the max pooling layer of the first DNN is configured to extract bottleneck features from the deep acoustic features, the bottleneck features being features, of the at least deep acoustic features, that are sensitive to channel artifacts.

According to an embodiment, batch normalization is applied, for at least one of the first DNN and the second DNN, to one or more of: the input layer, the hidden layers, the one or more fully-connected layers, and the output layer.

According to an embodiment, the second DNN is trained via at least one of gradient boosting and back propagation.

According to an embodiment, the second DNN is implemented using one or more graphics processors.

According to an embodiment, the configuration of the second DNN results from training the second DNN with a plurality of non-spoofed and known-spoofed voice samples.

According to an embodiment, an apparatus for detecting a spoofed voice source includes a receiving circuit configured to receive a voice sample, a first deep neural network (DNN) configured to extract at least deep acoustic features from the voice sample, and a second DNN configured to calculate from the deep acoustic features a likelihood that the voice sample includes a spoofing condition.

According to an embodiment, the apparatus further includes a binary classifier configured to classify the voice sample as being either genuine or spoofed based on the likelihood from the second DNN.

According to an embodiment, the apparatus may further include circuitry configured to extract other acoustic features from the voice sample, and a feature concatenation device configured to combine the deep acoustic features with the other acoustic features to provide tandem features, wherein the second DNN is further configured to classify the tandem features and to determine whether the tandem features include a non-spoofing condition or at least one spoofing condition, and the configuration to classify the at least the deep acoustic features is included in said configuration to classify the tandem features.

While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

FIGURES

Figure 6:
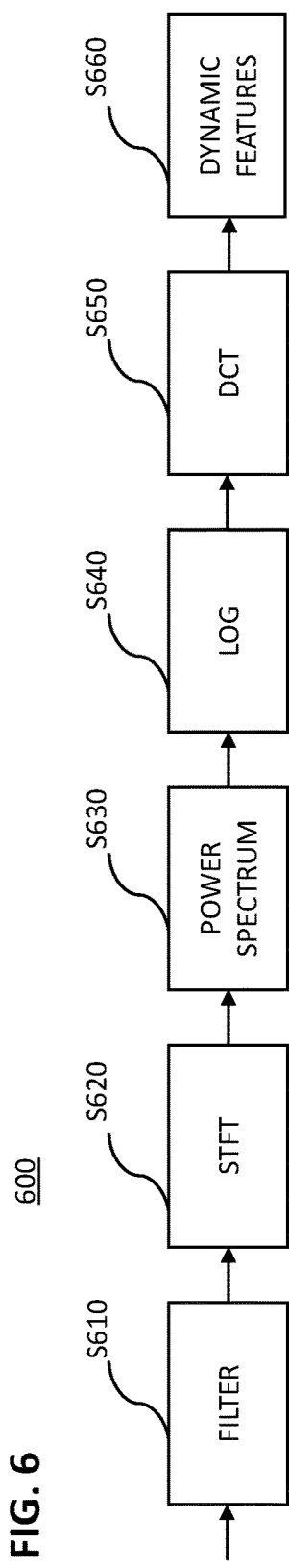
Figure 7:
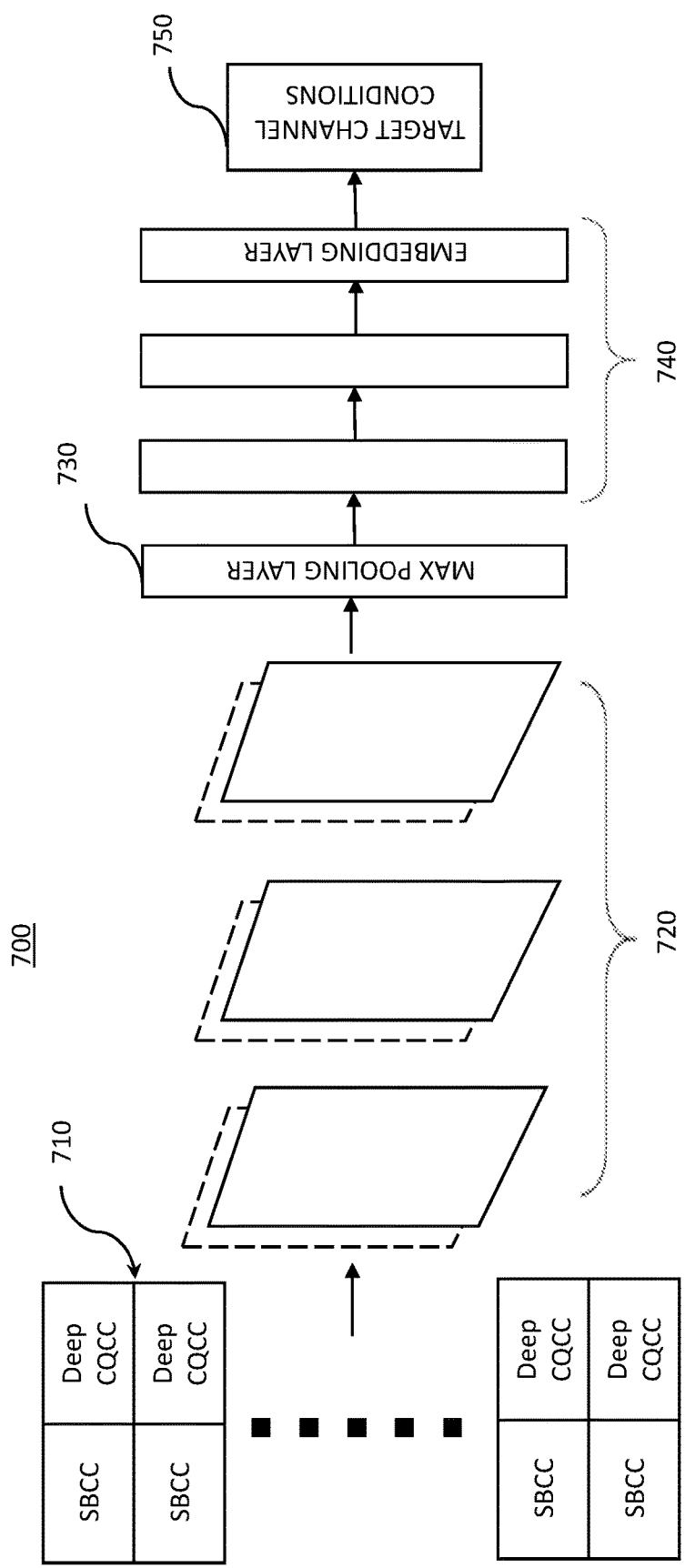

FIG. 1 is a block diagram illustrating an automatic speech verification (ASV) apparatus or system according to a general embodiment, FIG. 2 is a block diagram of a more specific implementation of the apparatus or system illustrated in FIG. 1, FIGS. 3A-C are flow charts detailing methods for classifying a voice sample as genuine or spoofed, according to respective embodiments, FIG. 4 illustrates an apparatus employing score fusion according to an embodiment, FIG. 5 illustrates an apparatus employing feature concatenation according to an embodiment, FIG. 6 illustrates a process for extracting sub-band cepstral coefficient features, and FIG. 7 is a block diagram of a second deep neural network configured to classify spoofing features from tandem features as illustrated in FIG. 5, according to an embodiment.

The above figures may depict exemplary configurations for an apparatus of the disclosure, which is done to aid in understanding the features and functionality that can be included in the housings described herein. The apparatus is not restricted to the illustrated architectures or configurations, but can be implemented using a variety of alternative architectures and configurations. Additionally, although the apparatus is described above in terms of various exemplary embodiments and implementations, it should be understood that the various features and functionality described in one or more of the individual embodiments with which they are described, but instead can be applied, alone or in some combination, to one or more of the other embodiments of the disclosure, whether or not such embodiments are described and whether or not such features are presented as being a part of a described embodiment. Thus the breadth and scope of the present disclosure, especially in any following claims, should not be limited by any of the above-described exemplary embodiments.

DETAILED DESCRIPTION

The detailed description set forth below in connection with the appended drawings is intended as a description of exemplary embodiments of the present disclosure and is not intended to represent the only embodiments in which the present disclosure can be practiced. The term "exemplary", when used in this description, means "serving as an example, instance, or illustration," and should not necessarily be construed as preferred or advantageous over other embodiments, whether labeled "exemplary" or otherwise. The detailed description includes specific details for the purpose of providing a thorough understanding of the embodiments of the disclosure. It will be apparent to those skilled in the art that the embodiments of the disclosure may be practiced without these specific details. In some instances, well-known structures and devices may be shown in block diagram form in order to avoid obscuring the novelty of the exemplary embodiments presented herein.

Spoofing is a fraudulent or malicious communication sent from an unknown source disguised as a source known to the receiver. ASV systems are being increasingly challenged by spoofing techniques like voice conversion, speech synthesis and replay attacks. Among these, replay attacks—also known as "presentation attacks"—have been shown to reduce the accuracy of conventional ASV systems by a significant margin. For example, in voice-based communications, a fraudulent caller may imitate or replay a known caller's voice intending to fool an Automatic Speaker Verification (ASV) system. Replay attacks are easy to generate, requiring no expertise in speech processing and/or machine learning, and very little expertise in any case. For example, with high quality recording and playback devices, it is conceivable to generate replay attacks that are nearly indistinguishable from a genuine access.

Conventional approaches to addressing replay attacks and other spoofing mechanisms have focused with increasing success on text-independent ASV systems. The inventors have recognized a need for methods and apparatus to effectively detect replay attacks and other spoofing means efficiently and quickly, in both text-dependent and text-independent ASV systems. (See Nagarsheth et al., "Replay Attack Detection using DNN for Channel Discrimination", INTERSPEECH, August 2017, incorporated herein by reference, in which the inventors discuss experimental observations and resultant systems in detail.)

FIG. 1 is a block diagram illustrating an automatic speech verification (ASV) apparatus or system 100 according to a general embodiment. A voice source 10 (e.g., a person or, typically fraudulently, a recording of a person) provides a voice sample 20 over an audio channel (e.g., telephone line, wireless channel, internet channel or the like) to the ASV apparatus or system 100. The voice sample is received by a feature extraction unit 110. The feature extraction unit 110 extracts from the voice sample statistical information referred to as "acoustic features" 115 and provides the acoustic features 115 to a feature classification unit 120. The feature classification unit 120 classifies the acoustic features 115 into at least one classification 125 among two or more classifications corresponding to respective spoofing conditions that can be represented in the extracted features. A binary classifier 130 may compare the resulting classification with a predetermined threshold score, resulting in a determination that the voice sample or audio source is "genuine" or "fraudulent" (or similar meanings). In some embodiments, the binary classifier 130 may compare the resulting classification with another classification 135 from previously stored low-level features for a voice model corresponding to an authorized user.

One or more enrollment models may be generated for each authorized user at a speaker enrollment time and stored in an enrollment database 140. In some embodiments, training models 145 including known spoofed and known clean models may be stored in training database possibly collocated with the enrollment database 140. The training models may be used to train the feature classification unit 120 to discriminate one or more spoofing conditions from a genuine access. In some embodiments, the enrollment models may also be used for purposes of identifying and/or verifying a speaker. The term "enrollment model" here includes an initial model generated at an enrollment time, and any updates to such model based on subsequent genuine interactions with the corresponding genuine speaker.

In particular, the inventors have recognized that a replay attack providing a recording of a speaker may, in certain low level features, include qualities found in a played-back recording that are typically not present in a (non-played back), or live, utterance. For example, recording an audio sample may consistently introduce audio artifacts related to frequency, frequency range, dynamic power range, reverberation, noise levels in particular frequency ranges, and the like, at least some of which artifacts may be imperceptible without using specialized speech processing techniques and/or equipment such as disclosed herein.

For example, a genuine speaker may consistently contact the ASV system using only a limited number of channels (e.g., via a particular home phone line and/or a particular cell phone line) having specific low-level audio qualities, thus providing an enrollment model that has particular, consistent low-level features. In some embodiments the ASV system may, as part of, instead of, or as the enrollment model, capture and store only the low-level features for later use in distinguishing spoofed and genuine access.

The ASV apparatus or system 100 may incorporate one or more programmed or application-specific processors, associated memory, input and output terminals, and the like, and may be implemented in a single monolithic device or distributed amongst plural proximate devices. In some embodiments, the hardware elements may incorporate devices disposed remotely and configured to communicate data using a data network. In each case, the hardware may include receiving circuitry or a receiving circuit (illustrated only implicitly) such as, but not limited to, telephony or data communication circuitry configured to receive the voice sample 20. In some embodiments, the features of the ASV system 100 may include computer executable instructions on a non-transient computer-readable medium.

FIG. 2 is a block diagram illustrating a more specific implementation 200 of the apparatus or system 100 illustrated in FIG. 1. The ASV apparatus or system 200 includes a deep neural network (DNN) 210 (corresponding to the feature extraction unit 110 in FIG. 1) configured to extract deep acoustic features 215 (corresponding to acoustic features 115). The deep acoustic features 215 are received by a second deep neural network 220 (corresponding to feature classification unit 120) configured to determine (e.g., calculate) from the deep acoustic features 215 a likelihood 225 that the voice sample 20 includes a spoofing condition. A binary classifier 230 (corresponding to binary classifier 130) may compare the determined or calculated likelihood 225 (e.g., a likelihood score corresponding to classification 125) with a previously determined threshold score. The binary classifier 230 may thus output an indication of "genuine" or "spoofed" depending on how the determined or calculated likelihood 225 compares with the threshold score.

In some embodiments the binary classifier 230 may compare the likelihood 225 with a previously determined likelihood 235 (corresponding to classification 135) that the spoofing condition was p resent in a previously processed enrollment sample. In some embodiments, the binary classifier 230 may employ a (different) predetermined threshold, comparing the calculated likelihood 225 (e.g., a likelihood score) is within a predetermined threshold distance or difference from the previously determined likelihood 235, the received voice sample 20 may be indicated as genuine. Otherwise, the received voice sample 20 may be indicated as spoofed.

The ASV apparatus or system 200 may incorporate one or more programmed or application-specific processors, associated memory, input and output terminals, and the like, and may be implemented in a single monolithic device or distributed amongst plural proximate devices. In some embodiments, the hardware elements may incorporate devices disposed remotely and configured to communicate data using a data network. In each case, the hardware may include receiving circuitry or a receiving circuit (illustrated only implicitly) such as, but not limited to, telephony or data communication circuitry configured to receive the voice sample 20. In some embodiments, the features of the ASV system 100 may include computer executable instructions on a non-transient computer-readable medium.

The first DNN in each embodiment disclosed herein may be implemented using a convolutional neural network where an input to the convolutional neural network is a raw audio signal, and output is the desired Deep CQCC features. The loss function used during training may be, but is not limited to, a mean square error between a "handcrafted" (or conventional) CQCC and a normalized CQCC. The error is then used to adjust values at each node of the convolutional neural network. Iterations of the training are aimed at minimizing the error until a predetermined minimum error is reached. Batch-normalization and dropout techniques may be used, despite additional computational cost and memory required for same.

FIG. 3A is a flow chart detailing a method 300a for classifying a voice sample as genuine or spoofed, e.g., using the ASV 200 of FIG. 2. In step S310, an automated speech verification (ASV) apparatus or system (e.g., 200) receives a voice sample (e.g., 20) from a voice source (e.g., 10). The voice sample may be received in a phone call from a wired or wireless telephone over a conventional or specialized telephony channel, a voice command captured directly from a voice source by an electronic, voice-responsive, intelligent personal assistant (e.g., AMAZON ECHO and the like) or voice-responsive phone app, or received by other electronic means. A genuine voice source is typically a live, preauthorized person speaking directly to the ASV via a transient-signal channel (e.g., live telephone call), whereas a "spoofed" voice source may include intentionally fraudulent recordings of a genuine voice, in the case of a replay attack, or in some cases may include unintended or accidental voice sources such as a television or radio in the background (e.g., in the case of an electronic personal assistant). Other spoofed voice sources may, as suggested above, include voice conversion and speech synthesis, each of which introduces its own acoustic artifacts and/or other unique qualities distinguishable by an appropriately trained DNN.

In operation S320, deep acoustic features are extracted from the voice sample. This may be accomplished via a first deep neural network (DNN) (e.g., DNN 210 in FIG. 2) that has been configured or trained for such extraction. In some embodiments, the first DNN may be supplied having been pre-trained. For example, DNN circuitry may have been particularly arranged, or DNN code may have been configured for execution, from a storage medium, by one or more processors, having already been trained by iterative processing of training samples known to include variations of low level acoustic qualities of interest. In some embodiments, however, the first DNN may be configured to be trained by such iterative processing.

In operation S330, the extracted deep acoustic features may be classified into at least one of two or more classifications corresponding to respective spoofing or channel conditions discernable in the extracted deep acoustic features by a second DNN (e.g., DNN 220 in FIG. 2). The second DNN may in some embodiments be trained to discriminate between, e.g., presence and absence of spoofing condition. In other embodiments, the second DNN may be configured to discriminate between each of a plurality of spoofing conditions. For example, the second DNN may be configured to discriminate between deep acoustic features for samples having low level features corresponding respectively to a replay attack, voice conversion and speech synthesis, and to an absence thereof. In some embodiments, the second DNN may provide a likelihood score for one or more of the spoofing types. For example, the second DNN may provide a likelihood score for presence of features corresponding to a replay attack, another likelihood score for presence of features corresponding to voice conversion, a third likelihood score for presence of features corresponding to speech synthesis. A high likelihood may correspond with a particular respective category. Low likelihood scores for each category may then suggest absence of spoofing conditions, and thus may be categorized as "genuine". Likewise, the second DNN may be trained to distinguish different channel conditions. For example, the second DNN may distinguish a voice sample sourced from outdoors, from a particular room size, from a particular device, or the like.

In some embodiments, in accord with operation S340, a likelihood score or classification may be further classified by a binary classifier (such as binary classifier 230) as genuine or spoofed. The binary classifier may be configured or trained to discriminate between the likelihood score or categorization resulting from operation S330 and a likelihood score or categorization associated with previously captured enrollment sample of an authorized user. In some instances the likelihood score or categorization of the enrollment sample may be predetermined and stored in association with the enrollment sample, e.g., in an enrollment database (e.g., enrollment database 140). Alternatively, the likelihood score or categorization for the enrollment sample may be determined when used for comparison. The binary classifier may include a simple comparison of likelihood score. An absolute difference between a likelihood score resulting from operation S330 and a likelihood score associated with previously captured enrollment sample, for example, may be compared with a threshold difference. For example, an absolute difference less than or equal to the threshold difference may indicate a genuine access. The threshold difference may be predetermined and stored, or may be calculated based on various factors. For example, the threshold difference may vary depending on factors such as gender, remoteness of a user at enrollment time or at test time (determined in another operation), or other factors that may affect a likelihood score. In another example, users having certain vocal disabilities may routinely use a recording or speech synthesis to access an account, and may therefore require a different, more lenient threshold in order to be verified.

The deep acoustic features extracted in operation S320 (e.g., by first DNN 210) may be Constant-Q Cepstral Coefficients (CQCCs). It is acknowledged the CQCC features may be obtained through means other than DNN. However, the inventors have recognized a benefit in cost and efficiency in utilizing a DNN for such extraction. Moreover, a DNN (such as first DNN 210) may be trained to distinguish features that would be much more difficult to account for using "handcrafted" CQCC features. For example, conventional CQCC features are typically derived from a perceptually inspired Constant-Q transform and may be classified using Gaussian Mixture Modeling (GMM). (See, e.g., Todisco, et al., "A New Feature for Automatic Speaker Verification Anti-spoofing: Constant Q Cepstral Coefficients", Odyssey 2016.) That derivation is, however, requires very high memory usage and processor time and resources. Consequently Deep CQCC features (extracted using a DNN), are advantageous because their calculation requires comparatively far fewer memory and processor resources. This becomes important as services utilizing ASV desire to make the ASV process seamless and transparent to the user, for lowest cost, as delays apparent to the user results in customer dissatisfaction.

Spoofing conditions, as briefly mentioned above, may include audio conditions and/or channel conditions. Audio conditions may include, but are not limited to, recording artifacts, playback artifacts, and/or artifacts that result from speech synthesis, speech conversion, and/or voice distortion. For example, even very sophisticated playback equipment may introduce spectral, temporal, and/or more complex artifacts that, although not necessarily aurally perceptible, may be identified by an appropriately trained deep neural network. Less sophisticated playback equipment naturally produces even more acoustic artifacts. Similarly, recording equipment and/or environment may introduce acoustic artifacts such, but not limited to, noise, hum, temporal stretch, and/or frequency limitations in addition to more complex artifacts such as power spectrum inconsistencies, and the like.

In some embodiments, audio conditions may include audio artifacts specific to one or more non-expected audio capture devices. For example, a genuine user, in all previous communications, may have accessed the ASV using a particular mobile telephone handset. A spoofing call, using a different telephone handset, a computer microphone, Internet of Things (IoT) device (e.g., AMAZON ECHO, GOOGLE HOME and the like) or other unexpected audio captured device, may include artifacts specific to a particular device, and may be different from artifacts introduced by the device employed by the genuine user at enrollment time and/or in subsequent voice communications.

Channel conditions may include low level artifacts introduced by the channel other than by recording or playback. For example, a voice sample transmitted over a spoofed telephone number (not to be confused with spoofed audio) may include artifacts not expected in a voice sample from a genuine user, such as, but not limited to quantization noise, switching noise, DC offset, filtering, and other spectral and/or temporal artifacts that may differ from those in an enrollment model, as well as higher order features that may be identified only by processing the voice sample, such as unexpected features in power spectral density and the like. Such spoofing conditions may be identified by an appropriately trained deep neural network such as described above. Training of such DNN may include conventional training techniques, while focusing on discriminating between non-spoofing conditions and known spoofing conditions.

Figure 3B:
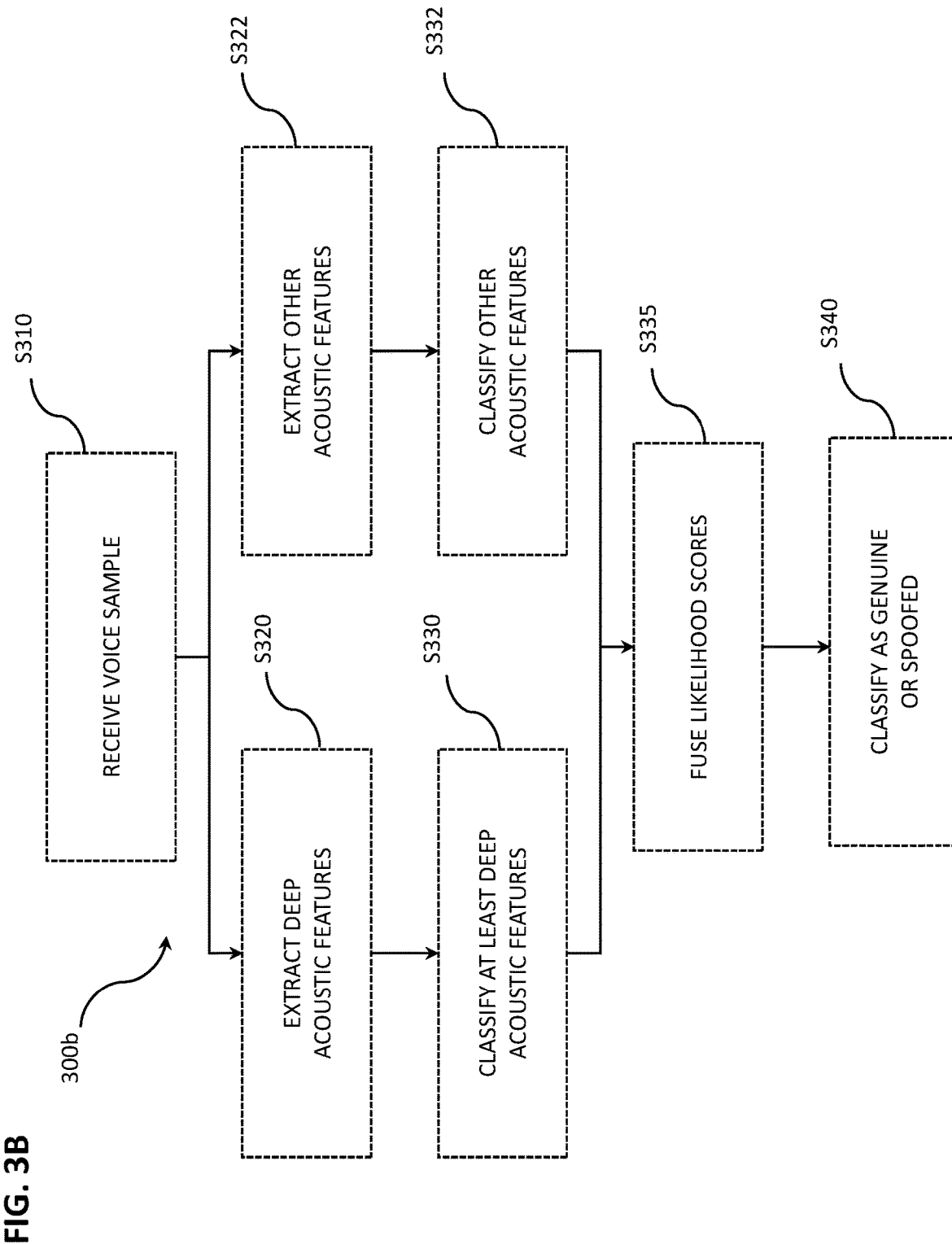

FIGS. 3B, 3C are flow charts depicting methods 300*b*, 300*c* for classifying a voice sample as genuine or spoofed according to other embodiments. Each of FIGS. 3B-3C illustrates use of an additional set of acoustic features extracted in parallel with the above-described deep acoustic features. Operation having a same label as in FIG. 3A have function described previously. In FIG. 3B, the deep acoustic features and other acoustic features are extracted separately and classified separately in operations S330 and S332, e.g., using independent second and third DNNs trained to identify low level features represented in the extracted features. Operations S330 and S332 may further include determining or calculating a likelihood score for each set of extracted features indicating likelihood that the extracted features include spoofing conditions. In operation S335 the likelihood scores are "fused", e.g., according to conventional score fusion techniques. The resultant fused likelihood score may be classified in operation S340 to indicate a genuine access or a spoofed access. In some embodiments, operation S340 may include comparison of the fused likelihood score with a predetermined threshold or against a likelihood score derived from a previously saved enrollment sample for the genuine user.

Returning to FIG. 3C, after deep acoustic features (e.g., Deep CQCC) features and other acoustic features are extracted, the features are combined, or placed in tandem to create "tandem features" at operation S325. The tandem features are classified in the same manner as described above for operation S330 and the resultant classification or likelihood score is used, at operation S340, to classify the voice sample (e.g., voice sample 20) as genuine or spoofed.

In some embodiments, the elements of methods 300a-300c may be provided as computer-executable instructions stored on one or more non-transitory computer readable media. In other embodiments, the elements of methods 300a-300c may be instantiated in hardware or a mixture of software/firmware and hardware as described herein. For example, the methods of FIGS. 3B-3C may be implemented as described below.

FIGS. 4-5 illustrate apparatuses or systems 400, 500 respectively configured to incorporate the methods in FIGS. 3B-3C. The deep acoustic features corresponding to FIGS. 3B-3C may be—as shown in FIGS. 4-5—Deep CQCC features used in combination (e.g., "tandem features") with other features extracted from the voice sample 20. In both FIG. 4 and FIG. 5, a voice sample 20 from a voice source 10 is received by both a first DNN 410, 510 (as described above with respect to first DNN 210, e.g., configured to extract deep CQCC features) and another feature extractor 412, 512. The another feature extractor 412, 512 may be configured to extract conventional features, such as Mel-frequency cepstrum coefficients (MFCCs), low frequency cepstrum coefficients (LFCC), sub-band cepstrum coefficients (SBCCs, introduced and described in detail below) or other coefficients known to provide useful low-level features for use in automated speaker verification. FIG. 4 illustrates an apparatus 400 employing score fusion for likelihood scores respectively generated for each of the two sets of extracted features according to an embodiment. FIG. 5 illustrates an apparatus 500 employing feature concatenation of features respectively generated by first DNN 510 and another feature extractor 512.

Turning first to FIG. 4, the features 415 extracted by the first DNN 410 and the features 417 extracted by the other feature extractor 412 may independently be processed, e.g., by respective second and third deep neural networks 420, 422, to generate respective likelihood scores indicating a likelihood that the voice sample 20 includes low-level feature represented in the respective extracted features (415, 417). The likelihood scores may be "fused" according to conventional techniques at a score fusion unit or algorithm 425 in order for the fused scores to be considered together by a decision unit 430 (e.g., binary classifier 230 configured as described above) to indicate a genuine access or a spoofed one. In some instances, one or both of the likelihood scores may be adjusted according to a predetermined algorithm, in some cases weighting and/or shifting at least one of the likelihood scores in order to ensure best results.

Turning now to FIG. 5, the extracted deep CQCC features 515 and extracted other acoustic features 517 may be concatenated by a concatenation unit or algorithm 518 or otherwise combined before being received by a second DNN 520 (e.g., corresponding to second DNN 220 in FIG. 2) for determination of a likelihood score or categorization. As with the embodiment described with respect to FIG. 4, the likelihood score or categorization may be received by a Decision unit 530, which may correspond to a binary classifier, such as binary classifier 230 in FIG. 2. A classification of genuine or spoofed may be based on a comparison of the likelihood score with a predetermined threshold and/or by comparison with a likelihood score of a previously stored enrollment sample associated with a genuine user for whom the voice sample is intended to match.

The apparatus or systems 400, 500 may each incorporate one or more programmed or application-specific processors, associated memory, input and output terminals, and the like, and may be implemented in a single monolithic device or distributed amongst plural proximate devices. In some embodiments, the hardware elements may incorporate devices disposed remotely and configured to communicate data using a data network. In each case, the hardware may include receiving circuitry or a receiving circuit (illustrated only implicitly) such as, but not limited to, telephony or data communication circuitry configured to receive the voice sample 20.

In some embodiments, the "other features" extracted in association with operations S322 in FIGS. 3B, 3C and elements 412, 512 of FIGS. 4 and 5 may include a sub-band cepstral coefficient (SBCC) features. Many features of voice samples have been considered, and the inventors recognized that spectral differences between genuine and spoofed (particularly replay attack) audio. Those spectral differences are particularly pronounced, in both higher and lower frequencies, in a spectrum traditionally thought to have low speech content. In most modeling and classification approaches, a short-time Fourier transform (STFT) is followed by cepstral extraction as a low-level feature vector for general speech processing tasks. The power-spectrum of the framed speech signal is often transformed by a filter bank for dimensionality reduction. While a Mel-scale filter bank is the most popular approach for speech recognition and speaker verification applications, it has been found that linear triangular filters or inverse gammatone filters are more suited to detect voice conversion and text-to-speech spoofing artifacts. In designing SBCC features for replay attack detection, the inventors reasoned that recording and playback devices designed for telephony may exhibit channel artifacts in the form of attenuation or emphasis of certain frequencies outside the voice band. (300-3400 Hz). These artifacts are more pronounced in low-quality recording or playback devices, while a high-quality recording-playback device pair tends to have a flatter frequency response.

FIG. 6 illustrates a process 600 for extracting SBCC features. SBCC features may be extracted by, at operation S610, sub-band filtering the voice sample before extracting the other features from the filtered sample. In some examples the voice sample is high-pass filtered, such that the extracted other features are high frequency cepstral coefficients (HFCCs). In some cases the filter cutoff frequency(ies) and fall-off rate(s) may be dynamically adjusted to address different types of spoofing, e.g., where the types of spoofing occur within different frequency bands. The extraction itself may commence at transform operation S620 including calculation of a short-time Fourier transform (STFT) on a frame from the filtered sample. A power spectrum of the STFT is calculated at operation S630. Next, at operation S640, a log-amplitude is calculated from the power spectrum, followed at operation S650 by calculation of an inverse discrete cosine transform (IDCT) of the log amplitude. Dynamic features are calculated from the IDCT at operation S660. Calculation of the dynamic features may include calculation of delta and/or delta-delta (acceleration) features. In some instances, the delta and delta-delta features may be calculated using a window size of 1.

Each of the first DNN (e.g., 210 in FIG. 2) and the second DNN (e.g., 220 in FIG. 2) may include an input layer, one or more hidden layers, one or more fully connected layers, and an output layer. Any of the layers may employ batch normalization. In some embodiments, batch normalization may be applied to all layers of at least the first DNN. This mitigates overfitting. Experimentally, the inventors provided an excerpt of raw audio (25.5 ms) to an input layer of the first DNN. An audio signal with a sampling rate of 16 kHz thus corresponded to 408 samples. The hidden layers consisted of a set of convolutional layers followed by a max-pooling layer to pool over time, and then another set of fully-connected layers. The number of units of the output layer is set to match the dimension of standard (e.g., "handmade") CQCC features.

FIG. 7 is a block diagram of a second deep neural network (DNN) 700 such as the second DNN 520 configured to classify spoofing features from tandem features as illustrated in FIG. 5. Tandem features 710 illustrate concatenation of SBCC features with Deep CQCC features. Although FIG. 7 illustrates a Deep CQCC coefficient appended to an SBCC coefficient, the reverse may be true (i.e., SBCC appended to Deep CQCC). Moreover, Deep CQCC may be combined with extracted features other than SBCC. The resulting tandem features are received by the DNN 700, which may include a plurality of convolutional layers 720 followed by at least one max pooling layer, one or more fully connected layers 740, and target channel conditions 750. In some embodiments, the last max pooling layer 730 of the first DNN may be configured to extract bottleneck features. The bottleneck features are features from the Deep CQCC that are sensitive to audio and/or channel artifacts. Improvement results in the ability of the bottleneck features to generalize to unseen spoofing conditions. That is, presently disclosed embodiments may handle unforeseen spoofing conditions more accurately than conventional anti-spoofing approaches.

Training of a DNN may take several paths. In the present disclosure, the second DNN (e.g., 220 in FIG. 2) may be trained via conventional approaches, with optimization done via gradient boosting and back propagation. The second DNN may be trained to discriminate between multiple channel conditions. For example, the second, classifying DNN may discriminate between different background environments (e.g., home, office, restaurant, street), between different acquisition devices (e.g. laptops, smart phones, AMAZON ECHO) and/or different network infrastructures (e.g. landline, cellular, and VoIP).

Any of the features described herein may be implemented in software or firmware executed by a programmed processor with memory, interfaces, etc., and may provide an output that can be expressed visually (e.g., via a display indication), audibly (e.g., via a particular sound), or by an action (e.g., terminating a call, joining a live operator to a call, or requesting additional information from the user.) In some instances, one or both the DNNs may be implemented using a graphics processor.

In the preceding detailed description, various specific details are set forth in order to provide an understanding of improvements for speaker recognition in a call center, and describe the apparatuses, techniques, methods, systems, and computer-executable software instructions introduced here. However, the techniques may be practiced without the specific details set forth in these examples. Various alternatives, modifications, and/or equivalents will be apparent to those skilled in the art without varying from the spirit of the introduced apparatuses and techniques. For example, while the embodiments described herein refer to particular features, the scope of this solution also includes embodiments having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

The present invention generally relates to an apparatus for performing the operations described herein. This apparatus may be specially constructed for the required purposes such as a graphics processing unit (GPU), digital signal processor (DSP), application specific integrated circuit (ASIC), field programmable gate array (FPGA) special purpose electronic circuit, or it may comprise a general-purpose computer selectively activated or reconfigured by a computer program stored in the computer. Such a computer program may be stored in a non-transient computer readable storage medium, such as, but is not limited to, any type of disk including optical disks, CD-ROMs, magneto-optical disks, read-only memories (ROMs), random access memories (RAMs), EPROMs, EEPROMs, magnetic or optical cards, integrated memory, "cloud" storage, or any type of computer readable media suitable for storing electronic instructions.

Algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description herein. In addition, the present invention is not described with reference to any particular programming language. It will be appreciated that a variety of programming languages may be used to implement the teachings of the invention as described herein.

Terms and phrases used in this document, and variations thereof, unless otherwise expressly stated, should be construed as open ended as opposed to limiting. As examples of the foregoing: the term "including" should be read to mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. Additionally, where a range is set forth, the upper and lower limitations of the range are inclusive of all of the intermediary units therein.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for detecting a spoofed voice source, the method comprising:
   receiving a voice sample;
   extracting at least deep acoustic features from the voice sample using a first deep neural network (DNN), wherein the first DNN comprises a max pooling layer that is configured to extract features of at least one audio artifact or channel artifact from the deep acoustic features; and
   calculating, via a second DNN that receives the extracted at least deep acoustic features, a likelihood that the voice sample includes a spoofing condition based in part on the features of at least one audio artifact or channel artifact in the deep acoustic features.

2. The method according to claim 1, further comprising: classifying the voice sample, using a binary classifier, as being either genuine or spoofed based on the likelihood from the second DNN.

3. The method according to claim 1, wherein the deep acoustic features are deep constant Q cepstral coefficients (CQCC).

4. The method according to claim 1, wherein the spoofing conditions include at least one of channel conditions and audio conditions.

5. The method according to claim 4, wherein the channel conditions include channel artifacts specific to at least one of different background environments, different acquisition devices, and different network infrastructures.

6. The method according to claim 1, further comprising:
   extracting other acoustic features from the voice sample;
   combining the deep acoustic features with the other acoustic features to provide tandem features, and
   classifying the tandem features using the second DNN, the second DNN configured to determine whether the tandem features include a non-spoofing condition or at least one spoofing condition, wherein
   said classifying at least the deep acoustic features is part of the classifying of the tandem features.

7. The method according to claim 6, wherein the other acoustic features are sub-band cepstral coefficient (SBCC) features, the method further comprising:
   sub-band filtering the voice sample before extracting the other features from the filtered sample, where said extracting the other, SBCC features includes:
      calculating a short-time Fourier transform (STFT) on a frame from the filtered sample,
      calculating a power spectrum from the STFT,
      calculating a log-amplitude from the power spectrum,
      calculating an inverse discrete cosine transform (IDCT) of the log-amplitude, and
      calculating dynamic features based on the IDCT.

8. The method according to claim 7, wherein said filtering the audio sample includes using a high pass filter, the filtered sample being limited to frequencies above a predetermined cutoff frequency.

9. The method according to claim 7, wherein said calculating dynamic features includes calculating at least one of delta and delta-delta (acceleration) features.

10. The method according to claim 1, wherein the second DNN is configured to extract multi-class features from the at least deep acoustic features.

11. The method according to claim 1, wherein the first DNN and the second DNN each include at least:
    an input layer,
    hidden layers, including one or more convolutional layers followed by the max-pooling layer,
    one or more fully-connected layers, and
    an output layer.

12. The method according to claim 11, wherein the max pooling layer of the first DNN is configured to extract bottleneck features from the deep acoustic features, the bottleneck features being sensitive to the at least one audio artifact or channel artifact.

13. The method according to claim 11, wherein batch normalization is applied, for at least one of the first DNN and the second DNN, to one or more of: the input layer, the hidden layers, the one or more fully-connected layers, and the output layer.

14. The method according to claim 1, wherein the second DNN is trained via at least one of gradient boosting and back propagation.

15. The method according to claim 1, wherein the second DNN is implemented using one or more graphics processors.

16. The method according to claim 1, wherein the configuration of the second DNN results from training the second DNN with a plurality of non-spoofed and known-spoofed voice samples.

17. An apparatus for detecting a spoofed voice source, the apparatus comprising:
    a receiving circuit configured to receive a voice sample;
    a first deep neural network (DNN) configured to extract at least deep acoustic features from the voice sample, wherein the first DNN comprises a max pooling layer that is configured to extract features of at least one audio artifact or channel artifact from the deep acoustic features; and
    a second DNN configured to calculate from the deep acoustic features a likelihood that the voice sample includes a spoofing condition based in part on the features of at least one audio artifact or channel artifact in the deep acoustic features.

18. The apparatus according to claim 17, further comprising:

a binary classifier configured to classify the voice sample as being either genuine or spoofed based on the likelihood from the second DNN.

19. The apparatus according to claim 17, wherein the deep acoustic features are deep constant Q cepstral coefficients (CQCC).

20. The apparatus according to claim 17, wherein the spoofing conditions include at least one of channel conditions and audio conditions.

21. The apparatus according to claim 20, wherein the channel conditions include channel artifacts specific to at least one of: different background environments, different acquisition devices, and different network infrastructures.

22. The apparatus according to claim 17, further comprising:
  circuitry configured to extract other acoustic features from the voice sample; and
  a feature concatenation device configured to combine the deep acoustic features with the other acoustic features to provide tandem features, wherein
  the second DNN is further configured to classify the tandem features and to determine whether the tandem features include a non-spoofing condition or at least one spoofing condition and
  the configuration to classify the at least the deep acoustic features is included in said configuration to classify the tandem features.

* * * * *